March 11, 1924.
E. HASSELL
BROADCAST SEEDER
Filed July 10, 1922   2 Sheets-Sheet 1
1,486,376
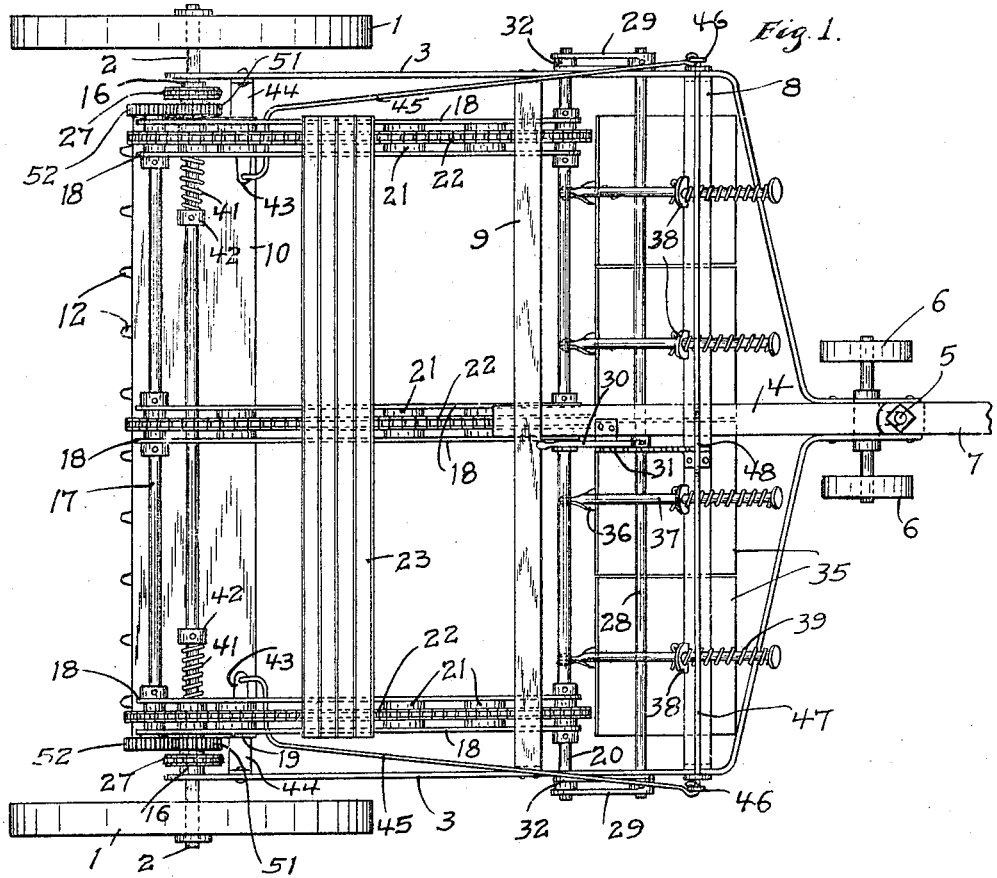
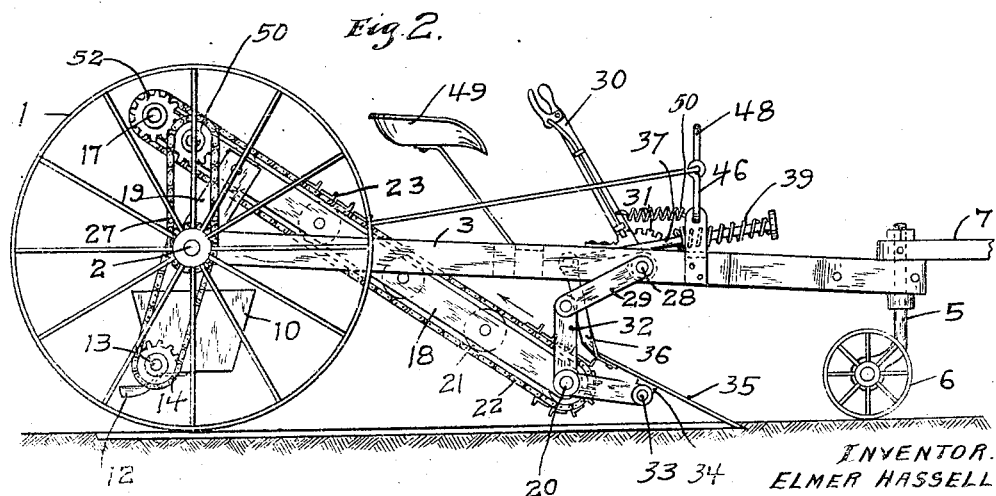
INVENTOR.
ELMER HASSELL.
BY HIS ATTORNEY.

March 11, 1924.
E. HASSELL
1,486,376
BROADCAST SEEDER
Filed July 10, 1922   2 Sheets-Sheet 2
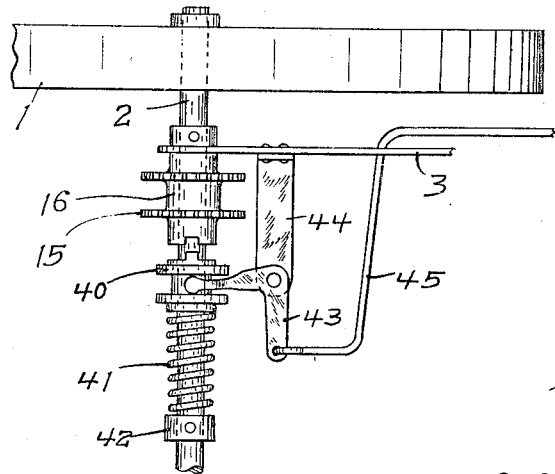
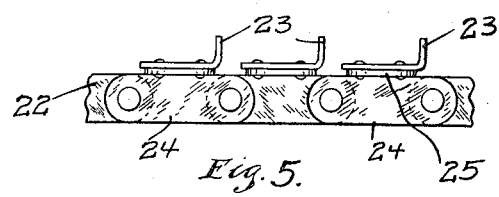
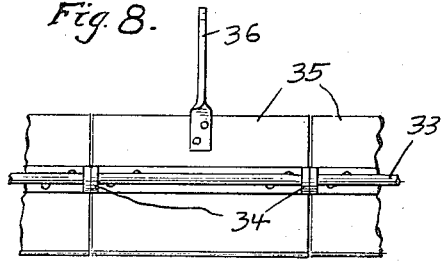
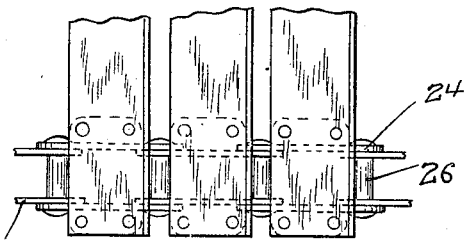
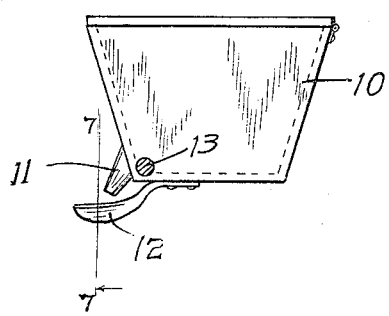
INVENTOR.
ELMER HASSELL.
BY HIS ATTORNEY.
James F. Williamson Patented Mar. 11, 1924.

1,486,376

UNITED STATES PATENT OFFICE.

ELMER HASSELL, OF CRYSTAL, NORTH DAKOTA.

BROADCAST SEEDER.

Application filed July 10, 1922. Serial No. 573,900.

*To all whom it may concern:*

Be it known that I, ELMER HASSELL, a citizen of the United States, residing at Crystal, in the county of Pembina and State of North Dakota, have invented certain new and useful Improvements in Broadcast Seeders; and I do hereby declare the following to be a full, clear, and exact description of the invention, such as will enable others skilled in the art to which it appertains to make and use the same.

This invention relates to a seeding machine, particularly adapted for seeding or planting of grain. It has been the general practice to plant grains and similar seeds by machines which distributed the grain in rows and cover the same after it has been discharged from the machine. It has long been recognized by experts in the art that it is desirable to have the grain scattered uniformly over the ground instead of the grains being brought together in such rows. The stalks resulting from the scattered seeds have more freedom for growth and more opportunity to become firmly seated in the soil than the stalks resulting from seed segregated in rows.

It is an object of this invention, therefore, to produce a simple and efficient machine adapted to discharge and distribute the seed uniformly over the ground and to effectively cover the same.

It is a further object of the invention to provide such a machine having a seed box or reservoir from which streams of grain are discharged onto deflectors which scatter the grain and cause the same to be uniformly distributed.

It is a still further object of the invention to provide such a machine comprising a conveyer adapted to receive earth lifted by mechanism at the front of the machine and to carry and discharge said earth onto the distributed grain.

It is more specifically an object of the invention to provide a machine having such an elevator of the endless conveyer type having earth carrying means thereon and receiving from a scoop located at the forward end of the machine, together with means for operating said parts and throwing the same into and out of operation.

These and other objects and advantages of the invention will be more fully set forth in the following description made in connection with the accompanying drawings in which like reference characters refer to the same parts throughout the different views, and in which, Fig. 1 is a plan view of the machine;

Fig. 2 is a view in side elevation thereof;

Fig. 3 is a partial plan view of certain parts shown on an enlarged scale;

Figs. 4 and 5 are, respectively, a view in side elevation and a plan of a portion of the conveyer used;

Fig. 6 is a view in end elevation of the seed reservoir and distributing mechanism;

Fig. 7 is a vertical section taken on the line 7—7 of Fig. 6; and

Fig. 8 is a partial bottom plan view of a portion of the front of the machine.

Referring to the drawings, the machine comprises a frame supported upon the main wheels 1 which also act as driving wheels and which are mounted on the ends of the axle 2. Said frame comprises side members 3 carrying bearings in which the said axle 2 rotates which extend along the side of the machine and then along the front thereof and are bolted to the forwardly extending tongue or central frame member 4. The latter member is supported upon a spindle 5 rising from a front truck 6, said member 5 also forming the connection for the tongue or traction member 7 pivoted thereon and held in position by a suitable nut on said member 5. The frame members 3 are connected by cross members 8 and 9. A seed box 10 is supported beneath the axle 2 by brackets connected to the ends thereof and to the rear ends of the frame members 3 which seed box has at its rear lower side spaced discharge spouts 11 through which the grain is adapted to pass. The grain discharged from these spouts falls upon spreading or deflecting devices 12 of curved shape in cross section and is scattered thereby onto the ground. A shaft 13 traverses the box 10 longitudinally and operates feeding or agitating mechanism therefor for causing the grain to be uniformly discharged through the spouts 11, which mechanism may be of any standard and well known type, said shaft being rotated by means of a chain 14 passing around sprockets on the ends thereof and over sprocket wheels 15 carried on a sleeve 16 mounted on an axle 2.

A shaft 17 is rotatably supported in bearings carried by spaced strips or longitudinal frame members 18. The latter members are formed in three pairs, the outer ones of which are supported by brackets 19 extending above and secured to the side members 3. The lower ends of said members 18 carry bearings in which rotates a shaft 20 extending across the machine somewhat adjacent the forward end thereof. Each pair of the members 18 has journaled therein spaced roller members 21 which form the supports for the endless chains 22 which carry the angle shaped slats 23 extending thereacross. The chain 22 is formed of spaced link members 24 having integral therewith the lugs 25 which are bent at right angles to the plane of said links and to which are riveted the slats 23, as shown in Figs. 4 and 5. Bushings 26 extend between the links 24 and the riveted pivot pins pass through said bushings and links and are headed on the outside of the latter and hold the chain and conveyer in assembled relation. The chains 22 pass over sprockets secured on the shaft 17 and said shaft is also provided with gears 52 at the ends thereof meshing with gears 51 on stub shaft 50 carried in frame members 18. Said shafts 50 carry sprockets over which pass chains 27, which chains extend downwardly from said shaft and pass over one of the sprockets on sleeve 16. The chains 22 at their lower ends, pass over sprockets secured to the shaft 20.

The shaft 28 is journaled in and extends between the frame members 3 forward of the shaft 20 and this shaft has secured at the ends thereof arms 29 pivoted at their other ends to bell crank levers 32, which levers extend downwardly and rotatably receive at their lower ends the ends of shaft 20. A handle lever 30 provided with the usual spring-actuated handle pawl is secured at its lower end to the shaft 28 and adapted to swing adjacent a toothed quadrant 31 secured to the cross member 8 and is adapted to be held in various positions of swinging movement by said pawl engaging said quadrant.

The levers 32 have rigidly formed thereon forwardly extending arms having bearings at their front ends in which are journaled the ends of a shaft 33 extending between said levers and along which shaft are pivotally mounted the down-turned ends of brackets 34 formed of flat strips or bars with their ends bent at right angles and to the flat part of which are bolted plate sections 35 of a scoop or platform member. Said sections 35 have bolted beneath the rear edges thereof and extending upwardly therefrom, arms 36 formed with eyes at their upper ends to which are pivotally connected forwardly extending rods 37, which rods extend through apertures formed in lugs 38 projecting upwardly from cross member 8, and are formed at their outer ends with headed portions. Coiled compression springs 39 are disposed between the lugs 38 and the headed portions on said rods and are normally under tension to move said rods forwardly and thus to swing the sections 35 downwardly at their front ends.

The sleeve 16 described is loosely mounted on axle 2 and is adapted to be clutched to said axle to turn therewith, and for this purpose is provided with notches adapted to be engaged by teeth projecting from a clutch member 40 splined to the said axle and normally urged into engagement with sleeve 16 by a coiled spring 41 disposed about said axle and engaging said clutch at one end, and a collar 42 pinned to the axle at its other end. The clutch member 40 is provided with a groove to receive a clutch fork formed in one end of a bell crank lever 43 pivoted in a bracket 44 secured to the side member 3, and the other end of the member 43 is engaged by a pull rod or link 45 extending forwardly at the side of the machine and swivelly connected at its forward end to an upstanding arm 46 formed at each end of a rod 47 extending across the frame above the cross member 8. The sleeve 16 and the clutch member operating the same are duplicated at each side of the machine. The rod 47 is formed with an upwardly projecting bail or U-shaped portion 48 substantially at the center thereof, which bail is adapted to be engaged by lever 30 when the same is swung to its forward position. The bail 48 will thus swing the rod 47 and the clutch 40 will be withdrawn from engagement with sleeve 16. A seat 49 is supported from the cross-piece 9 substantially centrally of the machine in convenient position for manipulating the lever 30 by the occupant thereof.

In operation, the parts of the machine will normally occupy the position shown in Figs. 1 and 2. The scoop sections 35 will have their lower front ends in engagement with the ground and travel a short distance beneath the surface thereof while the clutches 40 will be in engagement with sleeves 16. When the machine is drawn along the ground the axle 2 will turn and will, in turn, through the chain 14, drive the feeding shaft 13 so that the grain will be fed through the spouts 11. The grain discharged from the mouth of these spouts will drop upon the deflecting or spoon distributor 12 and will be uniformly scattered over the surface of the ground. As the scoop 35 travels along, the same will lift a certain amount of dirt which will be pushed backwardly over the surface of said scoop and will drop over the rear edge thereof. This dirt will be caught by or received in the conveyer slats 23 and will be conveyed upwardly toward the rear of the machine and will be dropped downwardly at the rear to cover the seeds which have been distributed over the surface of the ground. The conveyer will be driven through the chains 19 from the sprockets on sleeve 16.

The rollers 21 will insure that the conveyer maintains an even course and travels in a plane extending parallel to the axle 2.

The scoop section 35 will be held yieldingly in engagement with the ground by the springs 39 and will thus be enabled to spring up and pass over any stones or hard obstruction which they may encounter. The scoop sections and the lower end of the endless conveyer may be raised by moving the lever 30 forwardly and the inclination of the scoop and elevator can thus be considerably varied to suit the working conditions. If the lever 30 is swung to its extreme forward position, the lower end of the elevator and the scoop sections will be raised considerably above the ground and the lever 30 engaging the bail 48 will, through the rods 45, disengage the clutches 40 so that the seeding and covering operations of the machine will thus be stopped. The machine can then be driven and transported as desired without any seed being discharged and without the movement of the conveyer or the engagement of the ground by the scoop. When the lever 30 is again manipulated to place the scoop sections in engagement with the ground the clutch members 40 will automatically engage sleeve 16 and drive the conveyer and the seed feeding means. A spring 50 counterbalances frames 18 and the conveyor and tends to move lever 30 forwardly.

From the above description it is seen that applicant has provided a comparatively simple and efficient machine by which the seed can be rapidly planted and effectively covered. The parts of the machine are comparatively few and simple and easily controlled from one point which will be located adjacent the driver's seat.

It will, of course, be understood that various changes may be made in the form, details and arrangement of the parts without departing from the scope of applicant's invention, which, generally stated, consists in the matter shown and described and set forth in the appended claims.

What is claimed is:

1. A grain seeding machine having in combination, a wheel frame, a seed box extending transversely thereof, spaced seed spouts adapted to discharge grain from said box, spreading devices upon which said seed is discharged, and means for lifting earth from in front of said machine, carrying it upward over said box and depositing earth on the said discharged seed.

2. A grain seeding machine having in combination a wheeled frame, a seed box extending transversely thereof, spaced seed spouts adapted to discharge grain from said box, spreading devices upon which said seed is discharged, means for lifting earth from in front of said machine, an endless traveling floor receiving said earth and adapted to carry the same upwardly over said box and discharge the same at the rear of said machine and at the rear of said spouts and spreading devices, directly onto the discharged seed.

3. A seeding machine having in combination, a frame, a seed carrying box supported thereon, means for discharging seed from said box onto the ground, devices for lifting earth from a point in front of said seed carrying box and for carrying said earth upwardly over said box and depositing it upon the discharged seed, and members adapted for yieldingly positioning said lifting devices.

4. A seeding machine having in combination a frame, a seed carrying box supported thereon, means for discharging seed from said box onto the ground, devices for lifting earth from a point in front of said seed carrying box and for carrying said earth upwardly over said box and depositing it upon the discharged seed, means for driving said devices and elements adapted for raising said lifting devices and for simultaneously rendering inoperative said seed discharging means and said earth lifting devices.

5. A seeding machine having in combination a frame, main wheels supporting the same, an axle connecting said wheels, a seed box carried on said frame, means for discharging seed from said seed box onto the ground, means for lifting earth from in front of said box, elevating devices for carrying said earth upwardly over said box and depositing the same directly on the discharged seed, driving members connuected to said axle for operating said elevating devices, and lifting elements adapted for raising said earth lifting means and the front end of said elevating devices, said elements being also operable to render said earth elevating devices inoperative.

In testimony whereof I affix my signature.

ELMER HASSELL.